Figures 1, 2:
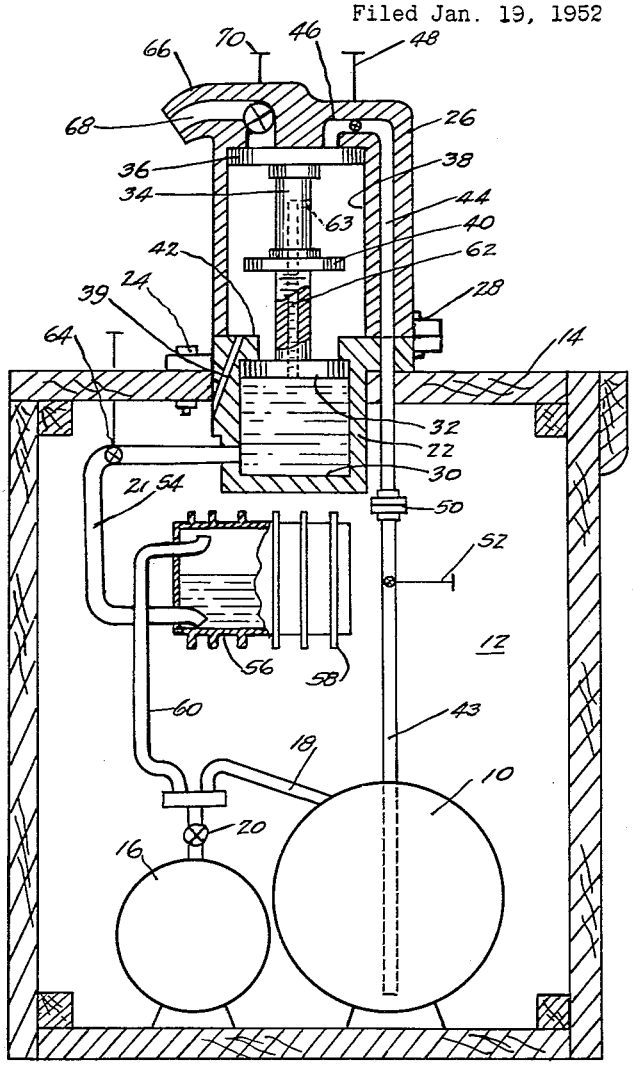

INVENTOR
CHARLES A. CLEMENTS
—— BY ——
ATTORNEYS
Strauch, Nolan + Diggins

United States Patent Office 2,746,271
Patented May 22, 1956

2,746,271
COOLING SYSTEM FOR LIQUIDS

Charles A. Clements, Victoria, British Columbia, Canada

Application January 19, 1952, Serial No. 267,260

5 Claims. (Cl. 62—141)

This invention relates to liquid dispensing systems, and has particular reference to novel methods and apparatus for cooling and dispensing liquids. The preferred embodiment of the invention is particularly adapted for cooling charged and uncharged or still beverages, such as beer and cola drinks, defrozen fruit juices and the like, dispensed at a bar or counter.

It is well-known that temperature is a highly important factor in successfully dispensing a charged or carbonated beverage. In order to keep the carbonic gases in solution the beverage must be maintained under suitable pressure, dependent upon its temperature. At atmospheric pressure, a carbonated beverage should be maintained at around 40° F. to hold the carbonic gases in solution. The optimum dispensing temperature for beer is about 42° F. and at higher temperatures and atmospheric pressure these gases are released and replaced by air causing the beer to be flat and unpalatable. On the other hand, maintaining a beverage such as beer at too cold a temperature is undesirable because any excessively cold beverage dulls the taste buds and the flavor goes unsavored, so that an over-chilled good grade of beer will taste no better than a poor grade. The temperature and manner of dispensing beer is also important in the maintenance of a desirable predetermined head of long lasting, fine bubble form on the beer, a mark of high quality draught beers.

It will be apparent therefore that for the most economical and effective dispensation of draught beer rather closely regulated temperature ranges should be maintained to insure that it will have its full flavor and zest, and a measured fine bubble head.

As a general rule, beverages such as beer dispensed at a counter or bar are delivered from a pressurized barrel or tank located at some point below or behind the counter. The supply tank can usually be refrigerated to cool the liquid therein, and presents no major problem. The primary cooling problem in such dispensing systems is to insure that the temperature of the liquid dispensed is substantially equal to the ideal temperature sought to be maintained at the supply tank. This problem is one of very long-standing, and although many attempts have been made to solve it, no satisfactory solution has heretofore been found.

Unfortunately, in the prior and present dispensing systems the liquid dispensed is considerably warmer than that in the supply tank. This is principally due to the fact that there is a direct connection between the source of supply and the dispensing tap. In order to force the liquid up to the tap a fairly high pressure must be maintained at the supply. Since such a pressure would cause any charged beverage to emerge from the tap as almost pure foam, coils of small diameter tubing are usually provided in the connecting line so that some of this pressure is dissipated by frictional forces as the beverage passes through the coils. However, because of this friction, and since the coils and dispensing equipment are uninsulated or inadequately insulated and therefore warmed by the surrounding atmosphere, the beverage dispensed from the tap is warmed to a point where the foaming during dispensation is more or less uncontrollable, excessive loss of carbon dioxide occurs, and it is not nearly as palatable as it could be under ideal conditions.

This undesirable situation is further aggravated by the fact that under the very best conditions in these prior dispensing systems there will be a solid column of the beverage in the line from the supply tank or barrel to the tap. When the tap is not being operated, this liquid is standing still in the line so that there will be considerably greater pressure at the supply end than there will be at the tap the moment the tap is opened to the much lower atmospheric pressure to draw a glass of the beverage. The result is, as has been demonstrated by tests, that a charged beverage such as beer literally momentarily "jumps" at the tap opening, causing agitation all the way back to the supply barrel. This agitation in the barrel causes the release of carbonic gases which rise to the surface of the beer in the barrel and break the surface tension that has acted as a blanket holding back the gas or air pressure applied to the surface as a counter pressure. Consequently, the "balance" of the beer in the barrel is changed. If because of unbalanced pressure there should be foam in the line, the "jump" will be worse and the agitation worse until a steady push is developed. In actual practice, the foregoing takes place every time the conventional beer dispensing tap is opened. The agitation causes an undesirable rise in temperature all along the line and in the barrel itself so that a steady temperature condition at the source of supply is nearly impossible to maintain. In addition, if air is used as the applied pressure in the barrel, the air goes into the beer, exchanging place with the carbonic gases, a natural gaseous phenomenon where surface tension is broken. The result is flat warm beer so that the product dispensed is unpalatable and too foamy with a large bubble, short lived head, and a considerable portion is wasted. All of this is very important not only to the consumer of the beverage, but to the vendor whose business depends upon the tastefulness of his draught beverages and the efficiency of the dispensing systems.

Proper cooling of the beverage dispensing system is equally important, however, from a health or sanitation viewpoint. Once the original container has been unsealed, any type of beverage, carbonated or still, becomes a breeding ground for deleterious microorganisms and bacteria if not maintained at all stages of handling at relatively cool temperatures. Microorganism development becomes rapid at above 55° F., and positive deterioration takes place at 65° F., affecting the taste both at and below room temperature. This applies particularly to live yeast organisms in beers in draught form.

To overcome the aforementioned problems and disadvantages of the prior art, the present invention provides a novel liquid dispensing and cooling system whereby the liquid may be dispensed uniformly from the tap at optimum temperatures for health and palatability and the system as a whole is maintained at a substantially constant temperature. In addition, novel cooling features are incorporated in dispensing apparatus which scientifically measures the exact amount of cool beverage dispensed each time the tap is opened and, in the case of a beverage such as beer, controls the foam formation in each glass. This effective and complete control results in an efficient dispensing system whereby the drinks may be dispensed in accurately measured amounts, waste is minimized and the original flavor, aroma and life of the beverage are maintained throughout complete dispensation of a barrel or container, regardless of the rate of dispensation and room temperature variations.

With the foregoing and other considerations in view it is, therefore, a primary object of this invention to provide a beverage dispensing and cooling method or system that insures dispensation of healthful and palatable beverages at all times.

Another important object of the invention is to provide a beverage dispensing and cooling apparatus whereby the beverage is dispensed at a temperature substantially equal to the temperature of the beverage at the source of supply.

A further object of the invention is to provide a beverage dispensing and cooling system which measures the exact quantities to be dispensed with each dispensing operation so that waste is maintained at a minimum.

A still further object of the invention is to provide a beverage dispensing and cooling system wherein the foam formation of carbonated beverages is accurately controlled independently of room temperature variations.

Another object is to provide a beverage dispensing and cooling apparatus wherein instrumentalities to measure a predetermined volume of beverage and to subsequently dispense the same are operated on the dispensing stroke by a cooled liquid which serves as a heat exchange medium.

A further object is to provide a cooling and dispensing apparatus wherein a metallic body enclosing dispensing instrumentalities partly extends into a cooled compartment.

Another object is to provide a beverage dispensing and cooling apparatus wherein a measuring chamber body is in communication with a cooled compartment and air from the compartment is sucked into the body on the dispensing stroke of the apparatus, and returned to the compartment on the opposite stroke of the apparatus.

Still another object is to provide a beverage dispensing and cooling apparatus wherein a piston reciprocable in a cylinder measures a predetermined volume of beverage on one stroke and dispenses it by gravity flow on its dispensing stroke, and a duct operatively connects the cylinder with a cooled compartment so that air is sucked into the cylinder from the compartment and forced back into the compartment alternately, by the piston.

Other objects and advantages of the invention will become apparent from the following detailed description read in conjunction with the accompanying drawings, and from the appended claims. The accompanying drawings, in which like reference numerals are used to designate similar parts throughout, illustrate the preferred embodiments for the purpose of disclosing the invention. The drawings, however, are not to be taken in a limiting or restrictive sense since it will be apparent to those skilled in the art that various changes in the illustrated construction may be resorted to without exceeding the scope of the invention.

In the drawings:

Figure 1 is a diagrammatic view of a preferred form of apparatus in accordance with the invention; and, Figure 2 is a diagrammatic, fragmentary view of a modified form of the apparatus shown in Figure 1.

Referring now to Figure 1 of the drawings, the cooling system of the present invention is shown as applied to, and forming part of a manually-controlled device for dispensing beverage from a pressurized barrel or tank 10 located in a refrigerated or cooled compartment 12, of which the top 14 forms the counter or bar top. When dispensing carbonated beverages barrel 10 is preferably maintained under pressure by compressed carbon dioxide, although compressed air may also be used. As shown in Figure 1, the carbon dioxide is led from bottle or tank 16 into barrel 10 through tubing 18. Shut-off valve 20 is provided so that the bottle 16 or barrel 10 may be replaced as necessary.

The actual dispensing control device comprises a lower metallic body portion 22 suitably fastened to the counter top 14 as by bolts 24, and an upper metallic body portion 26 removably secured to lower portion 22 by bolts 28 or any other suitable means such as quick-disconnect clamps. Lower body portion 22 extends below the counter top 14 into the refrigerated compartment 12 and is formed with an inner cylindrical chamber 30. The upper wall of chamber 30 is formed by a piston 32 which is (preferably rigidly) connected by means of a stem 34 to a piston 36 slidable in a cylindrical chamber 38 formed in upper body portion 26. Chamber 38 is of larger bore than chamber 30 and is an air chamber while chamber 30 is filled with an hydraulic fluid such as oil. Chamber 38 has direct communication with refrigerated compartment 12 by means of a passage 39 through the lower body portion 22. A flange or collar 40 is adjustably mounted on stem 34, and during downward movement of pistons 32 and 36 will engage shoulders 42 of lower body portion 22 to limit the extent of piston travel.

The supply barrel 10 is connected with the dispensing control device by means of suitable tubing 43, as for example stainless steel, which communicates in an air tight manner with a passage 44 in upper body portion 26. Passage 44 opens through a port 46 into chamber 38 and is provided with a shut-off valve 48. In order that upper portion 26 may be removed for cleaning or storage, and so that barrel 10 may be replaced when necessary, a suitable coupling 50 and shut-off valve 52 are provided in tubing 43.

Chamber 30 communicates as by conduit 54 with the lower portion of a sealed metal tank 56 within refrigerated compartment 12. Tank 56 may be provided with suitable fins as shown at 58. The upper portion of tank 56 communicates as by conduit 60 with compressed gas bottle 16. When piston 32 is in its uppermost position as shown in Figure 1, chamber 30 will be filled with oil or other hydraulic fluid and tank 56 will be partially filled with the fluid under the pressure of the compressed gas. Thus, the volume of oil will be such that when piston 32 is in its lowermost position tank 56 will be substantially filled. Stem 34 is provided with a bore 62 the upper end of which is provided with an air relief passage and valve diagrammatically indicated at 63 through which the trapped air may be bled from the hydraulic system. Bore 62 opens into oil chamber 30 so that the oil will fill the bore in any position of piston 32 after the trapped air is bled out through 63. Conduit 54 between chamber 30 and tank 56 is provided with a suitable one-way valve 64 of any conventional design which will allow the oil to move freely from chamber 30 to tank 56 but not in the opposite direction unless the valve is operated.

The dispensing tap 66 is provided with a passage 68 which is controlled by shut-off valve 70. As will be explained more fully hereinafter, valves 48, 64 and 70 are operated in a predetermined sequence and are all controlled by a single manually operated tap handle, not shown. The mechanism for operating these valves in sequence by means of the tap handle plays no part of this invention.

When the apparatus is readied for a business day, valves 20 and 52 are opened and left open throughout the day. The remaining valves are normally closed and operate in the following manner only in response to movement of the tap handle. The tap handle has two operative positions, "Fill" and "Draw." When the handle is moved to "Draw" position beverage valve 48 opens so that the beverage under pressure in tank 10 acts on piston 36 forcing it downwardly until flange 40 strikes shoulders 42. This will also cause piston 32 to force the oil from chamber 30 through the one-way valve 64. Because the diameter of piston 36 is larger than that of piston 32 the air in chamber 38 will be forced through passage 39 into the refrigerated compartment 12. Chamber 38 above piston 36 will then be filled with a measured amount of the beverage from the tank, the exact volume depending upon the vertical adjustment of the flange 40. The tap handle is next moved to "Fill"

position which closes beverage valve 48 and opens oil valve 64 and tap valve 70. In its initial opening movement when dispensing carbonated beverages such as beer, valve 70 relieves the pressure on the beverage with resultant fine champagne type bubble formation and reduction of the pressure on the beverage to atmospheric pressure as valve 70 opens. Oil under pressure in tank 56 will then flow back into chamber 30 causing it to gently raise pistons 32 and 36 at a controlled rate to bring the beverage above piston 36 up to the level of the tap passage 68 from which it will flow by gravity into the glass or other receptacle below the tap. During the time that pistons 32 and 36 are raised by the oil, air from the refrigerated compartment will rush back into chamber 38 below piston 36. When the beverage has drained from the tap into the glass, the tap handle is returned to its neutral position which again closes valves 64 and 70 so that the operation may be repeated. It is contemplated that the walls of upper body portion may be partially of clear plastic or contain a plastic window so that the counterman will be able to see just when chamber 38 is full of beverage in the "Draw" step, and just when it has been emptied in the "Fill" step.

It should be noted here that when still liquids such as citrus fruit juices are the liquids to be dispensed, a suitable type of agitator may be employed in conjunction with barrel 10 to periodically or continuously stir up the juice therein. The reason for this is that much of the taste esters of such juices are in the fine pulpy matter of the fruit, and this matter would normally settle to the bottom of the tank if it were not stirred up.

The foregoing operation has a great many important advantages that should be noted. In the first place, the quantity of beverage is accurately measured and is always the same. Secondly, beer, ales and like carbonated beverages are discharged in a state of fine champagne type bubbling from chamber 38 and allowed to fall by gravity into the glass. As a result, the filled glass is topped with a controlled portion of fine bubble foam with the body containing a maximum amount of carbonation to maintain the life of the beverage for a maximum period as it is slowly released while the temperature rises toward room temperature. This is not possible with any prior device wherein the beverage is forced under pressure directly out of the tap, causing excess large-bubbled foaming and a dispensed beverage which rapidly becomes flat, as well as causing considerable waste of undispensed beverage.

My improved method of cooling which continually takes place is highly important in attaining the foregoing new and improved results. The upper body portion 26 of the dispensing mechanism, even though it is located above the counter top 14 and therefore has a tendency to be warmed by the relatively warm ambient air, is maintained at the proper temperature in the following manner. With each downward stroke of piston 36 the volume of chamber 38 is rapidly decreased and the air therein is compressed and forced through passage 39 into refrigerated compartment 12. On the return stroke of piston 36 the volume of chamber 38 is rapidly increased with the result that the pressure therein is rapidly lowered. This tendency to create a vacuum is immediately broken by an in-rush of air from the only easily available source, the cold air in the refrigerated compartment 12. This air circulation or replacement of warmer air by cool air takes place each time a glass of beverage is dispensed and creates a very rapid cooling, the colder air being projected as a bombardment against the pistons and walls forming chamber 38. In addition, on each downward stroke of piston 32 the hydraulic fluid is forced out of chamber 30 into tank 56 which is at the low temperature of the refrigerated compartment 12. Since the fluid that was in chamber 30 will have been warmed somewhat due to the fact that the outer walls of the upper portion of the dispensing unit and the counter top are in contact with the relatively warm ambient air, this fluid will rise by convection to the upper stratum of the fluid in tank 56. Consequently, when valve 64 is opened the fluid under pressure that is forced back into chamber 30 will be the cooler fluid from the bottom of tank 56 and will lower the chamber temperature by absorption of heat from the walls thereof and from piston 32. The cool fluid forced into chamber 30 with each upward stroke of the pistons will also occupy passage 62 aiding in the cooling of stem 34 and air chamber 38. The upper, exposed portion of the dispensing apparatus will be further cooled if lower body portion 22 extending into refrigerated compartment 12 is made of a good heat transfer material so that it will draw warmth from the upper body portion 26. This transfer of heat will be enhanced if tubing 43 is also of some suitable transfer material.

Figure 2 illustrates a modified form of the invention wherein the vertical portion of fluid passage 44 is enlarged and tubing 43 is extended upwardly into the upper body portion 26 and threaded therein as at 72. The portion of tube 43 within the enlarged passage 44 is surrounded by an outer sleeve 74 of good insulating material such as a non-heat conducting plastic. Sleeve 74 is preferably sealed at each end around tube 43 so that an annular layer of dead air 78 surrounds the tube. As shown in Figure 2, the sleeve 74 is of a smaller diameter than the diameter of enlarged passage 44 and the passage is open at the bottom to refrigerated compartment 12 so that cool air from the compartment can circulate about the tube. This arrangement provides fairly definite assurance that any beverage passing through or standing in the upper portion of tube 43 will be maintained at the proper cool temperature even though there may be long periods of time between dispensing operations. Projection 77 holds tube 74 coaxial with passage 44.

The cooling methods described above are far more effective in liquid dispensing systems than any conventional method. Cold air circulated by a fan will not create different conditions of pressure which conditions alone cause rapid air bombardment and movement, and overcome the normal tendency of cold air to fall rather than rise. The cooling method of the invention in effect creates an atmospheric storm. The cyclical rapid change in pressures within the dispensing unit is efficient and practical, operating as it does in a sealed container, with channeled passages from the air and the oil, in closed circuits.

It will be apparent from the foregoing that my invention provides a novel liquid dispensing and cooling system wherein palatable and healthful beverages are dispensed at all times. In addition, the apparatus insures that an accurately measured amount of beverage is served at each dispensing operation, and controls the flow of the beverage from the supply tank to the glass so that the waste which heretofore was considered unavoidable with carbonated beverages is now substantially eliminated.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a beverage dispensing apparatus having a cooled compartment; a metallic hollow body including a lower portion extending into said compartment and formed with a bore and an upper portion removably secured to said lower portion extending outwardly of said compartment and formed with a bore; pistons slidable in said bores, respectively; a stem from one of said pistons and supporting the other piston; a metallic container within said compartment in operative communication with the bore in said lower portion; a liquid in said container and said lower bore; and means for forcing said pistons downwardly and upwardly, cyclically.

2. In a liquid dispensing and cooling system, a hollow body including a body portion forming a cylinder, a piston in said cylinder movable therein to define therewith a measuring chamber, a refrigerated compartment including a top wall upon which said body is supported, a reservoir in said compartment for the liquid to be dispensed, said body being formed with a duct opening into said chamber, said duct including a straight portion, an opening through said top wall in register with said straight duct portion, a pipe operatively connected to said reservoir and disposed within said straight portion to feed liquid into said chamber, and a sleeve of insulating material around said pipe extending through said opening, said duct and said opening being of a diameter in excess of that of said sleeve to provide an annular chamber opening into said refrigerated compartment.

3. In a liquid-dispensing and cooling system, the combination of a hollow body having spaced vertically-aligned bores of different diameters; a first piston slidable in one of said bores to provide a first expandable and contractible chamber; a second piston slidable in the other of said bores to provide a second expandable and contractible chamber and movable with said first piston; a refrigerated tank; a conduit between said tank and said second chamber; a volume of hydraulic fluid filling said second chamber and said conduit and at least part of said tank; a reservoir for liquid to be dispensed; a conduit between said reservoir and said first chamber; means providing gas to said reservoir and said tank at a substantially equal pressure; an outlet out of said body for the discharge of liquid in said first chamber; valves in said conduits; and a valve for controlling said discharge outlet.

4. In the combination set forth in claim 3, said first piston being of a diameter larger than that of said second piston whereby the pressure exerted on said first piston lowers said second piston to displace fluid from said second chamber into said tank when said conduit valves are opened.

5. In a liquid-dispensing and cooling system, the combination of a hollow body having spaced vertically-aligned bores of different diameters; a first piston slidable in the bore of larger diameter to provide a first expandable and contractible chamber; a discharge outlet out of said body for discharging liquid from said first chamber; a valve controlling said discharge outlet; a second piston slidable in the other of said bores to provide a second expandable and contractible chamber; means between said pistons for keeping said pistons in spaced relationship so that said pistons define with walls of said body a third chamber; a refrigerated compartment; an orifice through the wall of said body positioned to provide communication between said third chamber and said compartment; a reservoir for liquid to be dispensed; a conduit between said reservoir and said first chamber; a valve in said conduit; a refrigerated tank; a conduit between said tank and said second chamber; a valve in said conduit; a hydraulic fluid adapted to fill said second chamber and conduit and at least partially fill said tank; and a common source of pressure for subjecting said hydraulic fluid and the liquid in said reservoir to pressure.

References Cited in the file of this patent
UNITED STATES PATENTS

| | | |
|---|---|---|
| 1,924,525 | Taylor | Aug. 29, 1933 |
| 2,140,816 | Seitz | Dec. 20, 1938 |
| 2,146,058 | Doyle | Feb. 7, 1939 |
| 2,241,426 | Sherwood | May 13, 1941 |
| 2,427,429 | Waite | Sept. 16, 1947 |
| 2,590,519 | Du Pre | Mar. 25, 1952 |
| 2,618,938 | Booth | Nov. 25, 1952 |